US009787007B2

(12) United States Patent
Wang et al.

(10) Patent No.: US 9,787,007 B2
(45) Date of Patent: Oct. 10, 2017

(54) ELECTRONIC CARD CONNECTOR

(71) Applicant: Molex, LLC, Lisle, IL (US)

(72) Inventors: Hong-Liang Wang, Chengdu (CN); Shang-Xiu Zeng, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/266,438

(22) Filed: Sep. 15, 2016

(65) Prior Publication Data

US 2017/0093057 A1    Mar. 30, 2017

(30) Foreign Application Priority Data

Sep. 30, 2015   (CN) ..................... 2015 2 0775131 U (51) Int. Cl.
| | | |
|---|---|---|
| *H01R 27/00* | (2006.01) | |
| *H01R 12/52* | (2011.01) | |
| *H01R 12/73* | (2011.01) | |
| *H01R 12/70* | (2011.01) | |
| *H01R 13/635* | (2006.01) | |

(52) U.S. Cl.
CPC ......... *H01R 12/52* (2013.01); *H01R 12/7076* (2013.01); *H01R 13/635* (2013.01)

(58) Field of Classification Search
CPC ........ H01R 27/00; H01R 12/52; H01R 12/73; H01R 12/526; G06K 7/0021
USPC ................ 439/630, 218; 361/679.02, 679.31
See application file for complete search history.

(56) References Cited

U.S. PATENT DOCUMENTS

| | | | |
|---|---|---|---|
| 6,101,372 A | 8/2000 | Kubo | |
| 6,602,096 B1 | 8/2003 | Kronestedt | |
| 7,112,075 B1 | 9/2006 | Su | |
| 7,232,321 B1 | 6/2007 | Lai | |
| 7,726,991 B2 | 6/2010 | Ma et al. | |
| 8,371,866 B1 | 2/2013 | Su | |
| 8,568,174 B2 * | 10/2013 | Liu ........................ | H01R 27/02 439/630 |
| 9,444,198 B2 | 9/2016 | Wang | |
| 2003/0032317 A1 | 2/2003 | Ooya | |
| 2005/0221681 A1 | 10/2005 | Shobara | |
| 2009/0280657 A1 | 11/2009 | Satoh | |
| 2014/0017920 A1 | 1/2014 | Takasaki | |

(Continued)

FOREIGN PATENT DOCUMENTS

| | | |
|---|---|---|
| CN | 202977785 U | 6/2013 |
| CN | 103378478 A | 10/2013 |

(Continued)

*Primary Examiner* — Gary Paumen
(74) *Attorney, Agent, or Firm* — James A. O'Malley (57) ABSTRACT

An electronic card connector includes a metal shell, a tray, a first terminal block, a second terminal block and a third terminal block. The metal shell is provided on a circuit board and cooperates with the circuit board to define a slot. The tray comprises an insulative body and a shielding unit. A first receiving groove of the insulative body receives a SD card and second and third receiving grooves of the insulative body respectively receive first and second SIM cards. The shielding unit is made of metal, provided in the insulative body and positioned between the first receiving groove and the second receiving groove and the third receiving groove, so as to shield the electromagnetic interference from the SD card.

10 Claims, 11 Drawing Sheets

(56) References Cited

U.S. PATENT DOCUMENTS

| | | | |
|---|---|---|---|
| 2014/0078660 A1* | 3/2014 | Dondzik | H04B 1/3888 361/679.31 |
| 2014/0099805 A1* | 4/2014 | Kutchery | H04B 1/3816 439/76.1 |
| 2014/0104767 A1* | 4/2014 | Sutherland | H04B 1/3816 361/679.02 |
| 2014/0315404 A1 | 10/2014 | Wang | |
| 2015/0079847 A1* | 3/2015 | Liu | H01R 12/721 439/630 |
| 2015/0207284 A1* | 7/2015 | Liu | G06K 7/0052 439/218 |

FOREIGN PATENT DOCUMENTS

| | | |
|---|---|---|
| CN | 104038586 A | 9/2014 |
| CN | 204011822 U | 12/2014 |
| CN | 204011895 U | 12/2014 |
| CN | 204333327 U | 5/2015 |
| CN | 204680779 U | 9/2015 |

\* cited by examiner

ELECTRONIC CARD CONNECTOR

RELATED APPLICATIONS

This application claims priority to Chinese Application No. 201520775131.7, filed Sep. 30, 2015, which is incorporated herein by reference in its entirety.

TECHNICAL FIELD

The present disclosure relates to an electronic card connector, and more specifically relates to an electronic card connector used to electrically connect one SD card and two SIM cards.

BACKGROUND ART

An existing mobile communication device usually uses a SD card to expand the memory capacity, and use a SIM card to identify a user, and the existing mobile communication device can support two SIM cards. In order to save a volume occupied by an electronic connector used to electrically connect the SD card and the SIM card, the existing electronic connector may be mounted with one SD card and two SIM cards at the same time, for example Chinese patent application No. CN201410209921.9.

Because the SD card is used to store data, an electromagnetic action will be generated during the high-speed data transfer of the SD card and will interfere with the signal transfer of the SIM card, thereby affecting the call quality. Furthermore, an antenna of a general mobile communication device is positioned adjacent to the electronic connector, the electromagnetic action generated during the high-speed data transfer of the SD card will also interfere with receiving and transmitting a signal of the antenna, thereby causing a noise during the call process of the user.

SUMMARY

Therefore, the present disclosure provides an electronic card connector which can reduce the electromagnetic interference so as to improve the call quality of a mobile communication device.

Accordingly, in some embodiments, an electronic card connector of the present disclosure is provided on a circuit board and comprises a metal shell, a tray, a first terminal block, a second terminal block and a third terminal block. The metal shell is provided on the circuit board and cooperates with the circuit board to define a slot. The tray is used to receive a SD card, a first SIM card and a second SIM card, and inserted into and ejected from the slot along an inserting-ejecting direction, the tray comprises an insulative body and a shielding unit. The insulative body has a top surface, a bottom surface opposite to the top surface, a first receiving groove, a second receiving groove, a third receiving groove and an opening region. The first receiving groove is formed on the top surface so as to receive the SD card, the second receiving groove and the third receiving groove are formed on the bottom surface so as to respectively receive the first SIM card and the second SIM card, the opening region penetrates from the top surface to the bottom surface and is communicated with the first receiving groove so as to expose a conductive pad of the SD card out of the bottom surface. The shielding unit is made of metal, provided in the insulative body and positioned between the first receiving groove and the second receiving groove and the third receiving groove. The first terminal block is provided on the circuit board and positioned in the slot so as to electrically connect the SD card and the circuit board. The second terminal block is provided on the circuit board and positioned in the slot so as to electrically connect the first SIM card and the circuit board. The third terminal block is provided on the circuit board and positioned in the slot so as to electrically connect the second SIM card and the circuit board.

In some embodiments, the opening region, the second receiving groove and the third receiving groove are arranged on the bottom surface along the inserting-ejecting direction, and the second receiving groove is positioned between the opening region and the third receiving groove.

In some embodiments, the shielding unit comprises two metal sheets, the two metal sheets respectively cover the second receiving groove and the third receiving groove.

In some embodiments, the shielding unit comprises one metal sheet, the one metal sheet covers the second receiving groove and the third receiving groove.

In some embodiments, the insulative body further has a plurality of arc protruding portions respectively protruding from two side wall surfaces defining the second receiving groove and two side wall surfaces defining the third receiving groove so as to correspondingly hold the first SIM card and the second SIM card.

In some embodiments, the insulative body further has a plurality of arc protruding portions protruding from two side wall surfaces defining the first receiving groove so as to hold the SD card.

In some embodiments, the first terminal block comprises a first insulative housing and a plurality of first terminals provided to the first insulative housing and soldered to the circuit board, the second terminal block comprises a second insulative housing and a plurality of second terminals provided to the second insulative housing and soldered to the circuit board, the third terminal block comprises a third insulative housing and a plurality of third terminals provided to the third insulative housing and soldered to the circuit board, and the first terminal block, the second terminal block and the third terminal block are arranged along the inserting-ejecting direction, and the first terminal block is positioned farthest away from the entrance of the slot.

In some embodiments, the electronic card connector further comprises a detection switch provided to the first insulative housing and soldered to the circuit board. The detection switch comprises a fixed terminal and an elastic terminal. The fixed terminal has two fixed portions spaced apart from each other and fixed to the first insulative housing, a soldering portion extending from one of the two fixed portions and a bridging portion connecting the two fixed portions, the bridging portion has a lower surface facing the circuit board. The elastic terminal has a fixed section fixed to the first insulative housing, a soldering section extending from a side of the fixed section, and an elastic arm bent from an end of the fixed section and extending to above the fixed section. The elastic arm has a contact portion which abuts against the lower surface of the bridging portion in a normal state, and a pressed portion formed at a distal end of the elastic arm, the pressed portion is higher than the bridging portion in the normal state, and when the tray is inserted into the slot, the pressed portion is pressed down by the tray and moves toward the fixed section and in turn moves the contact portion so as to separate the contact portion from the bridging portion.

In some embodiments, the metal shell has a top plate spaced apart from the circuit board and two side plates respectively connected to two sides of the top plate and facing each other, the two side plates each have a linear elastic section separated from the top plate, and each elastic section has a latching portion bent and protruding into the slot; two sides of the insulative body of the tray further each are formed with a latching block and a latching groove, the latching block and the latching groove of each side of the insulative body are arranged along the inserting-ejecting direction and adjacent to each other; when the tray is inserted into the slot and reaches a predetermined position, the two latching portions of the metal shell are respectively latched into the two latching grooves at the two sides of the tray and respectively stop the two latching blocks to move toward the entrance of the slot so as to limit the tray.

In some embodiments, the two side plates of the metal shell further each have two mounting sections respectively connected with two ends of the corresponding elastic section, each mounting section has at least a soldering portion soldered to the circuit board.

The present disclosure at least has the following beneficial effects: the metallic shielding unit may reduce the interference of the magnetic field generated during high-speed transfer of the SD card on the two SIM cards, thereby improving the call quality. Furthermore, the two metal sheets may further reduce the electromagnetic interference generated by the SD card, thereby reducing the interference on the antenna signal, and better improving the call quality. And the latching portion bent from the linear elastic section has a higher structure strength, can allow repeated insertion and ejection of the tray and will not be deformed.

BRIEF DESCRIPTION OF THE DRAWINGS

The other features and effects of the present disclosure will be apparent through detailed description of embodiments with referring to Figures, and in which.

DETAILED DESCRIPTION OF THE PREFERRED EMBODIMENTS

Referring to FIG. 1 through FIG. 4, an electronic card connector of an embodiment of the present disclosure is provided on a circuit board 1, and comprises a metal shell 2, a tray 3, a first terminal block 4, a second terminal block 5, a third terminal block 6 and a detection switch 7.

The metal shell 2 is provided on the circuit board 1, and the metal shell 2 cooperates with the circuit board 1 to define a slot 21. The tray 3 is used to receive a SD card 8, a first SIM card 91 and a second SIM card 92, and is inserted into and ejected from the slot 21 along an inserting-ejecting direction A. The tray 3 comprises an insulative body 31 and a shielding unit 32. The insulative body 31 has a top surface 311, a bottom surface 312 opposite to the top surface 311, a first receiving groove 313, a second receiving groove 314, a third receiving groove 315 and an opening region 316. The first receiving groove 313 is formed on the top surface 311 so as to receive the SD card 8, the second receiving groove 314 and the third receiving groove 315 are formed on the bottom surface 312 so as to respectively receive the first SIM card 91 and the second SIM card 92, the opening region 316 penetrates from the top surface 311 to the bottom surface 312 and is communicated with the first receiving groove 313 so as to expose a conductive pad 81 of the SD card 8 out of the bottom surface 312. In the embodiment, the opening region 316, the second receiving groove 314 and the third receiving groove 315 are arranged on the bottom surface 312 along the inserting-ejecting direction A, and the second receiving groove 314 is positioned between the opening region 316 and the third receiving groove 315. The insulative body 31 further has a plurality of arc protruding portions 317 protruding from two side wall surfaces defining the first receiving groove 313 so as to hold the SD card 8, and a plurality of arc protruding portions 318 respectively protruding from two side wall surfaces defining the second receiving groove 314 and two side wall surfaces defining the third receiving groove 315 so as to correspondingly hold the first SIM card 91 and the second SIM card 92.

Figure 5:
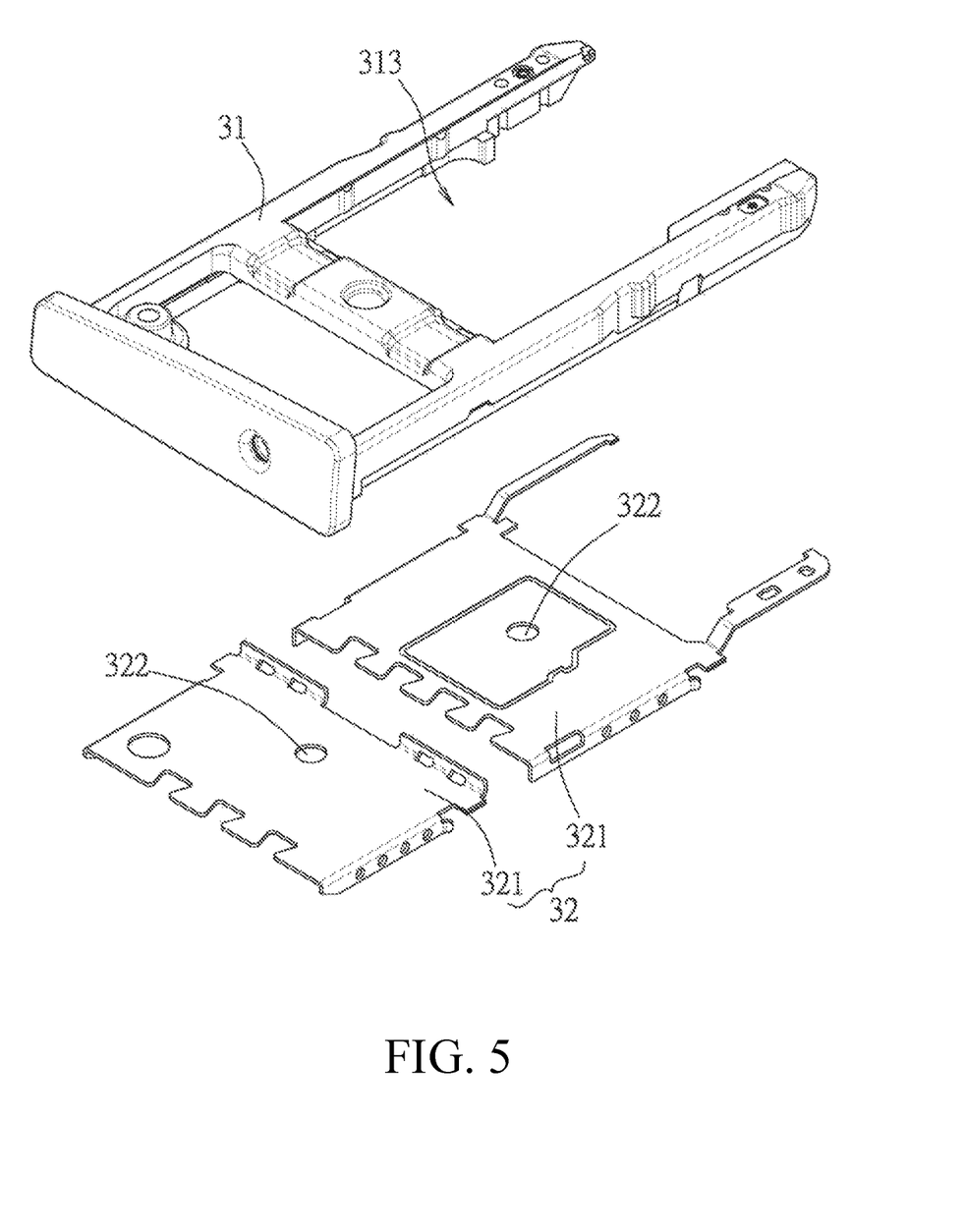
FIG. 5 is an exploded perspective view illustrating an insulative body of the tray of the embodiment and a shielding unit.
Figure 6:
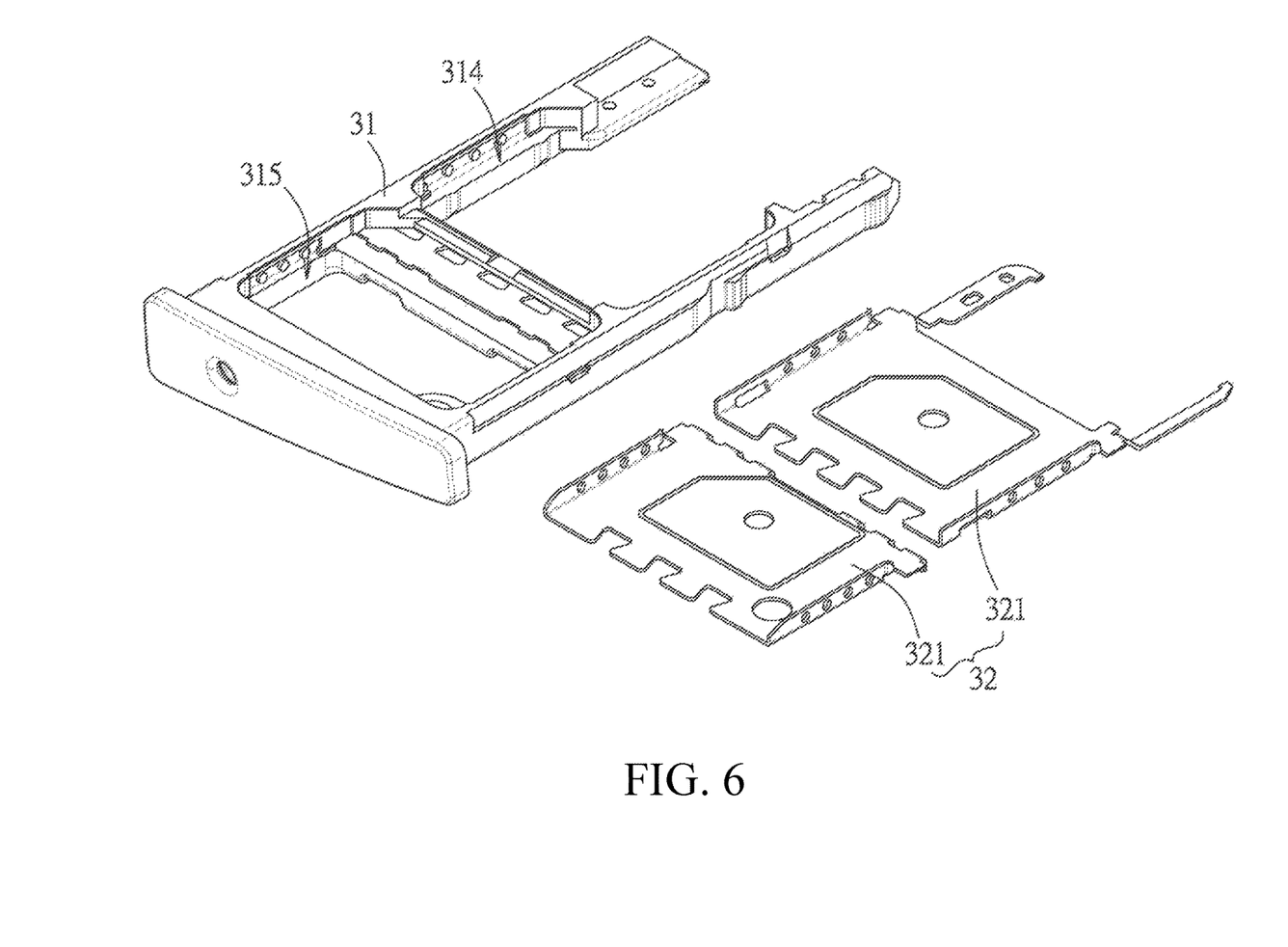
FIG. 6 is view of FIG. 5 viewed from another angle.
Figure 7:
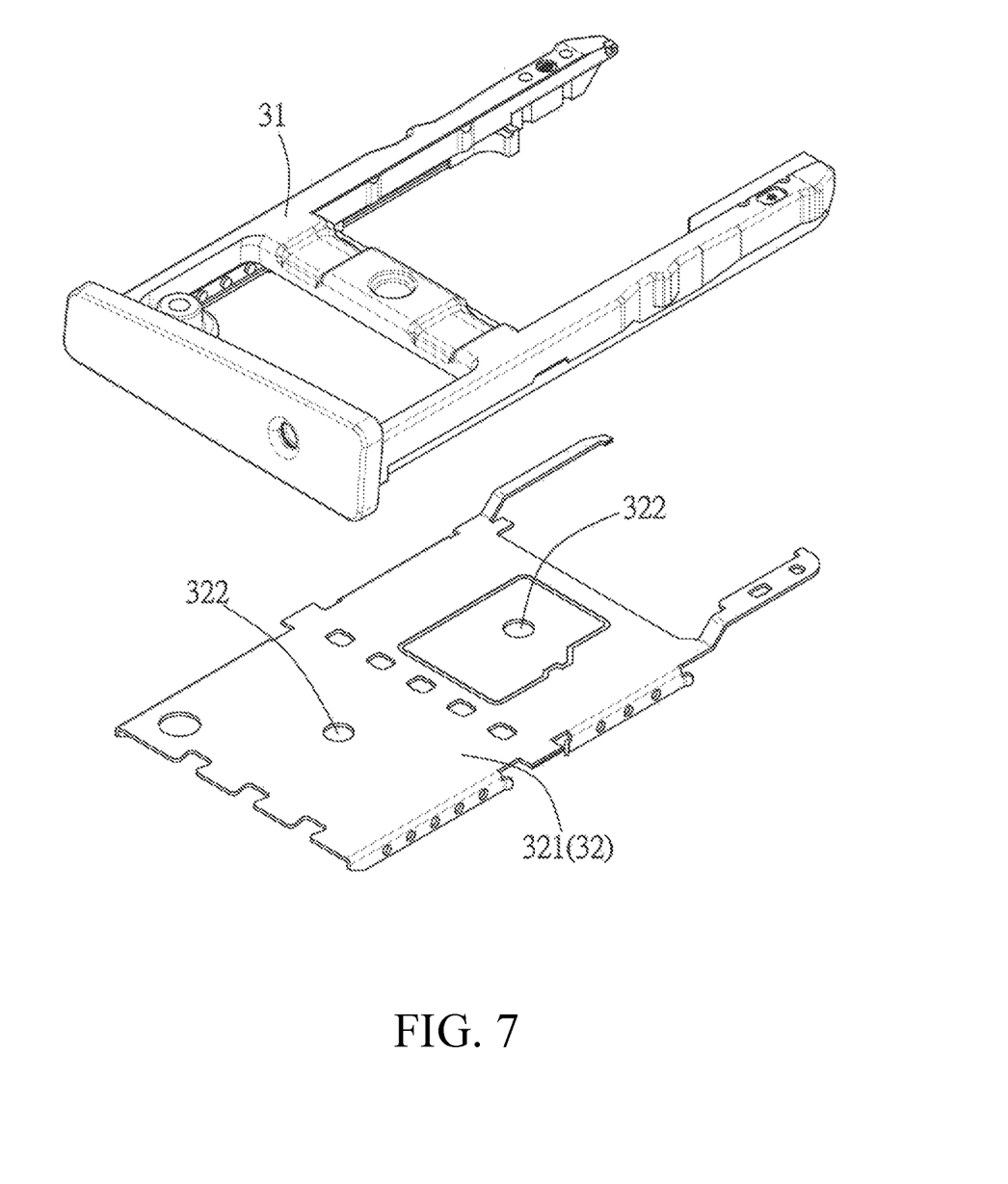
FIG. 7 is a view similar to FIG. 5 illustrating another embodiment of the shielding unit.
Figure 8:
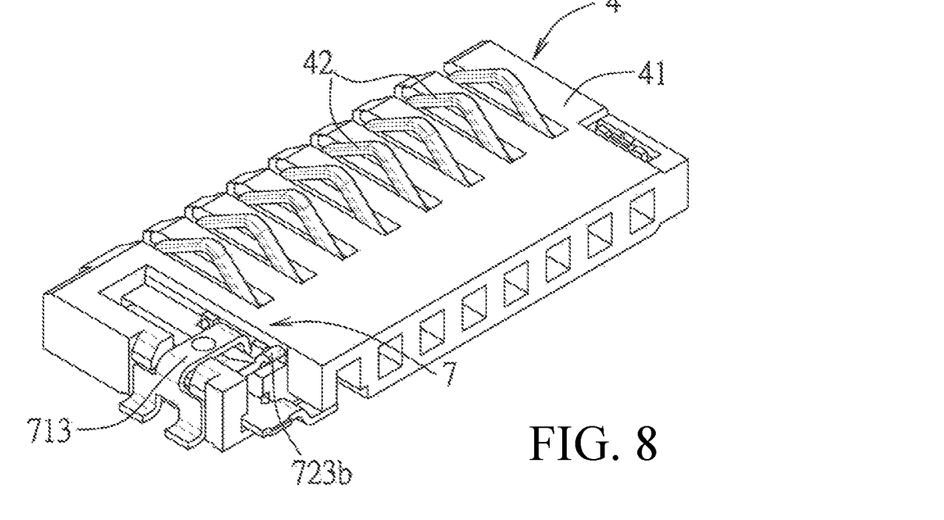
FIG. 8 is a perspective view illustrating a first terminal block and a detection switch of the embodiment.
Figure 9:
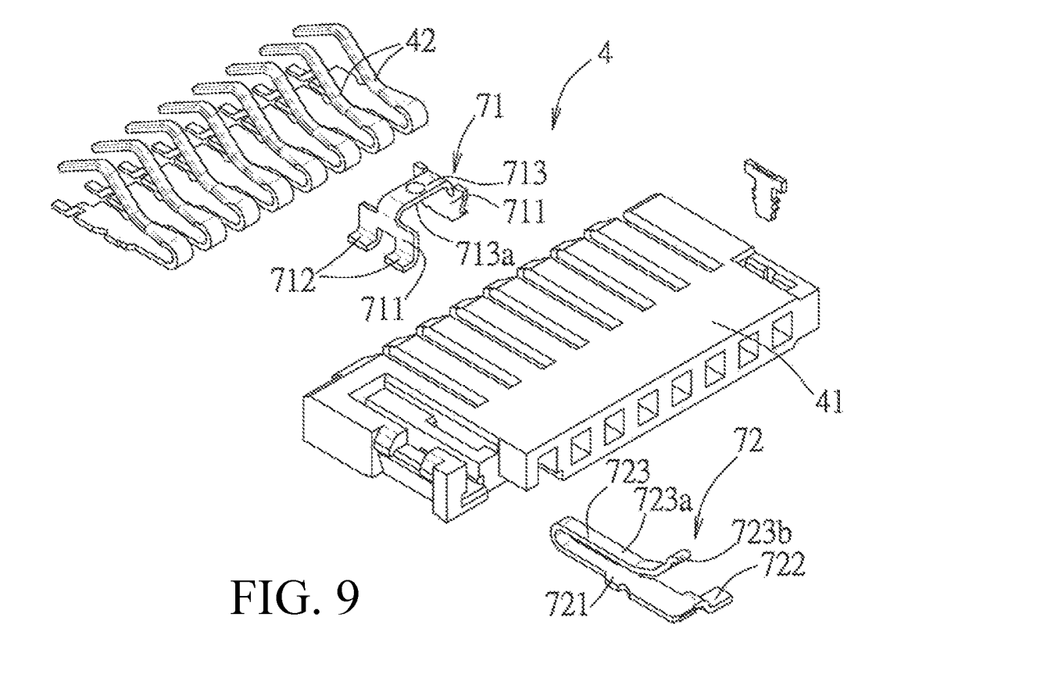
FIG. 9 is an exploded perspective view illustrating an assembling relationship of components of the first terminal block and components of the detection switch of the embodiment.

And further referring to FIG. 5 and FIG. 6, the shielding unit 32 is made of metal, provided in the insulative body 31 and positioned between the first receiving groove 313 and the second receiving groove 314 and the third receiving groove 315. In the embodiment, the shielding unit 32 comprises two metal sheets 321, the two metal sheets 321 respectively cover the second receiving groove 314 and the third receiving groove 315, and one of the two metal sheets 321 separates the first receiving groove 313 from the second receiving groove 314, therefore a spacing thickness between the first receiving groove 313 and the second receiving groove 314 is just a thickness of the metal sheet 321, such as 0.15 mm, because the thickness of the metal sheet 321 is smaller, so the whole thickness of the tray 3 can be decreased, and the shielding unit 32 made of metal may reduce the interference of the magnetic field generated during high-speed transfer of the SD card 8 on the two SIM cards 91, 92, thereby improving the call quality. Furthermore, an antenna of a general mobile communication device (not shown) is positioned adjacent to the second SIM card 92, the electromagnetic interference generated by the SD card 8 can be further reduced via the two metal sheets 321 by transferring the electromagnetic interference from the metal sheet 321 adjacent to the first SIM card 91 to the metal sheet 321 adjacent to the second SIM card 92, thereby reducing the interference on the signal of the antenna and better improving the call quality. If the interference on the antenna is not taken into account, in another embodiment, the shielding unit 32 may also be a single metal sheet 321 (see FIG. 7), the single metal sheet 321 covers the second receiving groove 314 and the third receiving groove 315, which may also reduce the interference of the magnetic field generated during high-speed transfer of the SD card 8 on the two SIM cards 91, 92, and improve the call quality. Moreover, the two metal sheets 321 are provided with pin holes 322 respectively corresponding to the first SIM card 91 and the second SIM card 92, pins (not shown) respectively pass through the pin holes 322 to respectively eject the first SIM card 91 and the second SIM card 92, which facilitates respectively removing the first SIM card 91 and the second SIM card 92 out of the second receiving groove 314 and the third receiving groove 315.

Referring to FIG. 1, FIG. 2, FIG. 8 through FIG. 12, the first terminal block 4 is provided on the circuit board 1 and positioned in the slot 21 so as to electrically connect the SD card 8 and the circuit board 1. The first terminal block 4 comprises a first insulative housing 41 and a plurality of first terminals 42 provided to the first insulative housing 41 and soldered to the circuit board 1. The second terminal block 5 is provided on the circuit board 1 and positioned in the slot 21 so as to electrically connect the first SIM card 91 and the circuit board 1. The second terminal block 5 comprises a second insulative housing 51 and a plurality of second terminals 52 provided to the second insulative housing 51 and soldered to the circuit board 1. The third terminal block 6 is provided on the circuit board 1 and positioned in the slot 21 so as to electrically connect the second SIM card 92 and the circuit board 1. The third terminal block 6 comprises a third insulative housing 61 and a plurality of third terminals 62 provided to the third insulative housing 61 and soldered to the circuit board 1. The first terminal block 4, the second terminal block 5 and the third terminal block 6 are arranged along the inserting-ejecting direction A, and the first terminal block 4 is positioned farthest away from the entrance of the slot 21. That is to say, a position of the first terminal block 4 corresponds to the opening region 316 of the tray 3, a position of the second terminal block 5 corresponds to the second receiving groove 314 (see FIG. 3), a position of the third terminal block 6 corresponds to the third receiving groove 315 (see FIG. 3).

Figure 10:
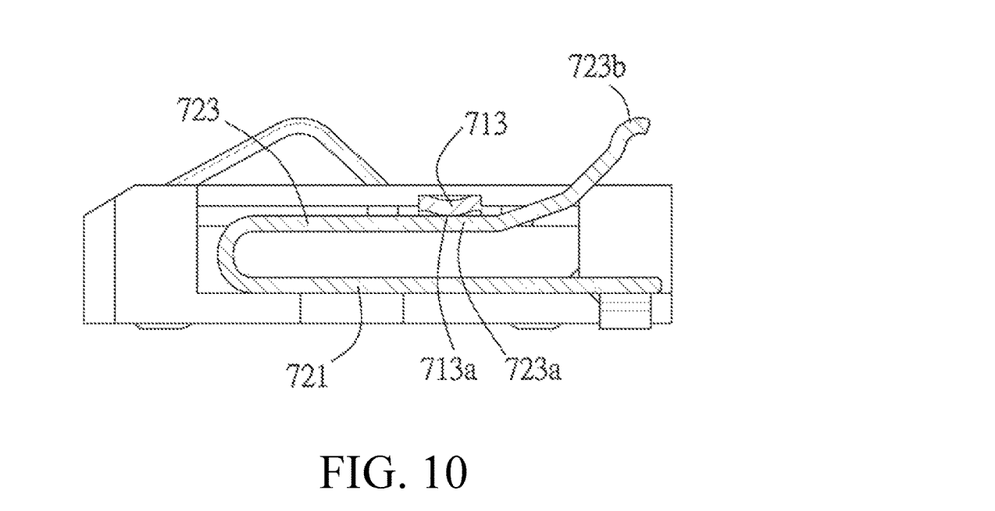
FIG. 10 is a sectional view illustrating that the detection switch establishes an electrical connection before the tray is inserted into the slot in the embodiment.
Figure 11:
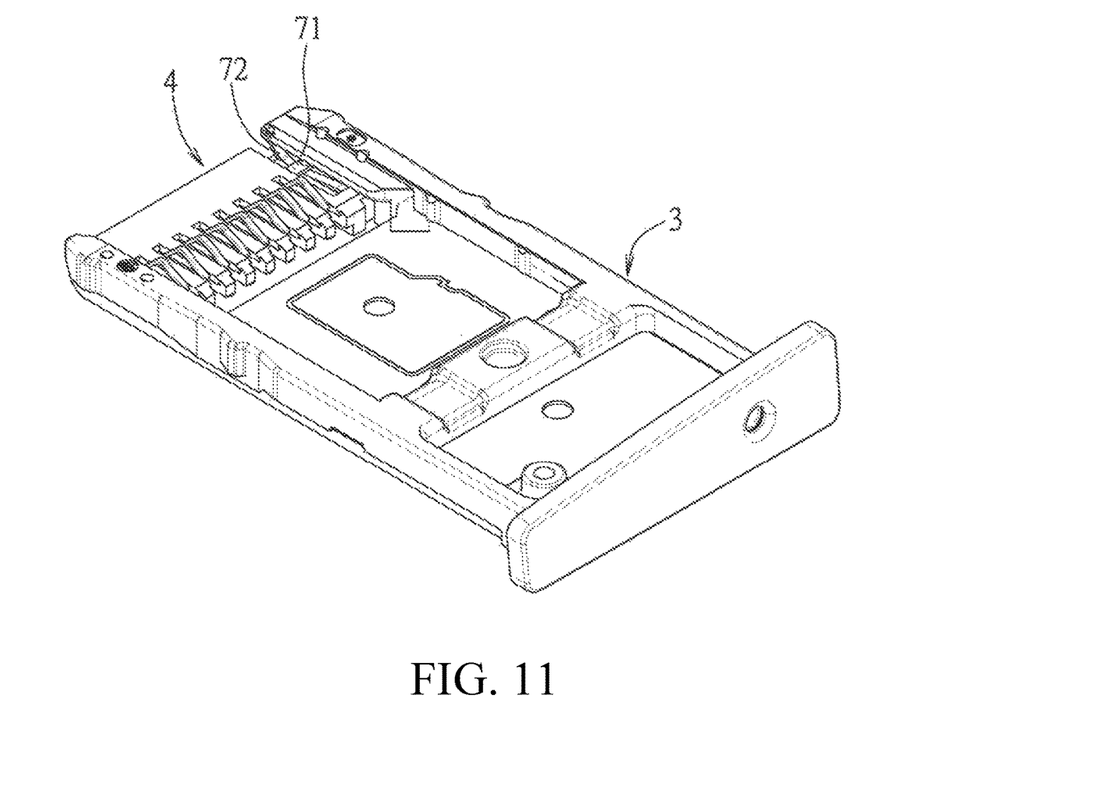
FIG. 11 is a perspective view illustrating an interaction relationship of the tray and the detection switch of the embodiment.
Figure 12:
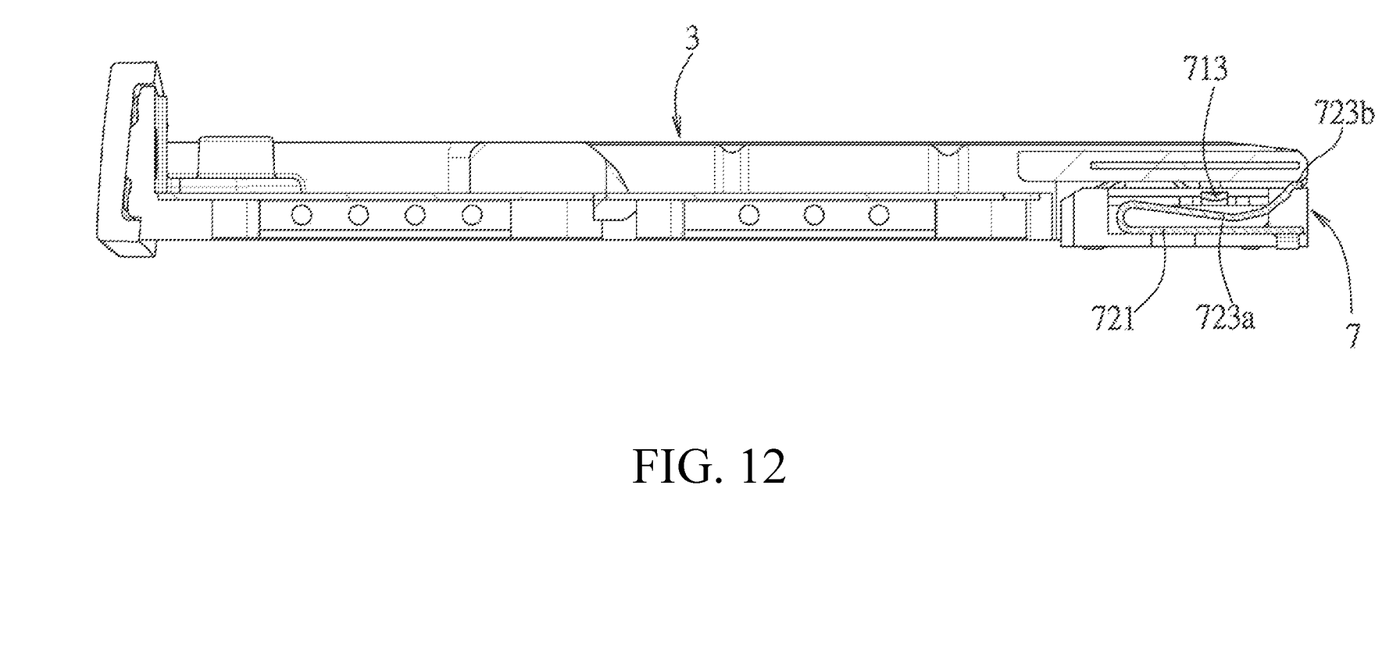
FIG. 12 is a sectional view illustrating that the detection switch of the embodiment interrupt the electrical connection after the tray is inserted into the slot.

The detection switch 7 is provided to the first insulative housing 41 and soldered to the circuit board 1. The detection switch 7 comprises a fixed terminal 71 and an elastic terminal 72. The fixed terminal 71 has two fixed portions 711 spaced apart from each other and fixed to the first insulative housing 41, a soldering portion 712 extending from one of the two fixed portions 711 and a bridging portion 713 connecting the two fixed portions 711. The bridging portion 713 has a lower surface 713*a* facing the circuit board 1. The elastic terminal 72 has a fixed section 721 fixed to the first insulative housing 41, a soldering section 722 extending from a side of the fixed section 721, and an elastic arm 723 bent from an end of the fixed section 721 and extending to above the fixed section 721. The elastic arm 723 has a contact portion 723*a* which abuts against the lower surface 713*a* of the bridging portion 713 in a normal state (see FIG. 10), and a pressed portion 723*b* formed at a distal end of the elastic arm 723. Referring to FIG. 10 through FIG. 12, the pressed portion 723*b* is higher than the bridging portion 713 in the normal state (see FIG. 10), and when the tray 3 is inserted into the slot 21, the pressed portion 723*b* is pressed down by the tray 3 and moves toward the fixed section 721 and in turn moves the contact portion 723*a* so as to separate the contact portion 723*a* from the bridging portion 713 (see FIG. 12). That is to say, when the tray 3 is not inserted into the slot 21, the elastic terminal 72 and the fixed terminal 71 are contacted each other to establish an electrical connection, when the tray 3 is inserted into the slot 21 and reaches a predetermined position, the elastic terminal 72 and the fixed terminal 71 are separated from each other to interrupt the electrical connection, thereby detecting whether the tray 3 has been inserted into slot 21 and has reached the predetermined position. In the embodiment, the bridging portion 713 of the fixed terminal 71 is connected between the two fixed portions 711, therefore the whole structure of the fixed terminal 71 is more stable so as to ensure the stability of the detection switch 7.

Figure 1:
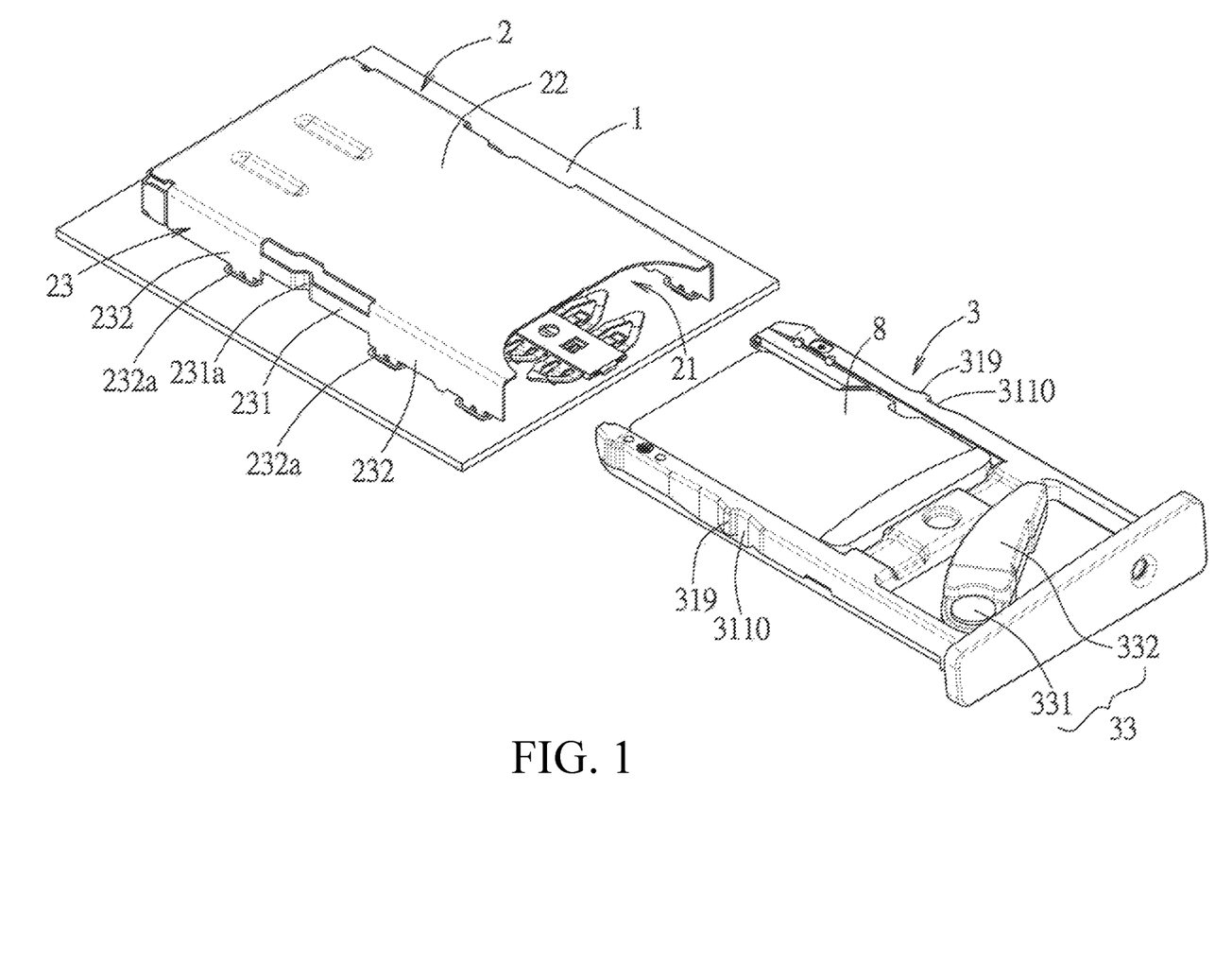
FIG. 1 is an exploded perspective view illustrating that a tray is not inserted into a slot in an electronic card connector of an embodiment of the present disclosure.
Figure 2:
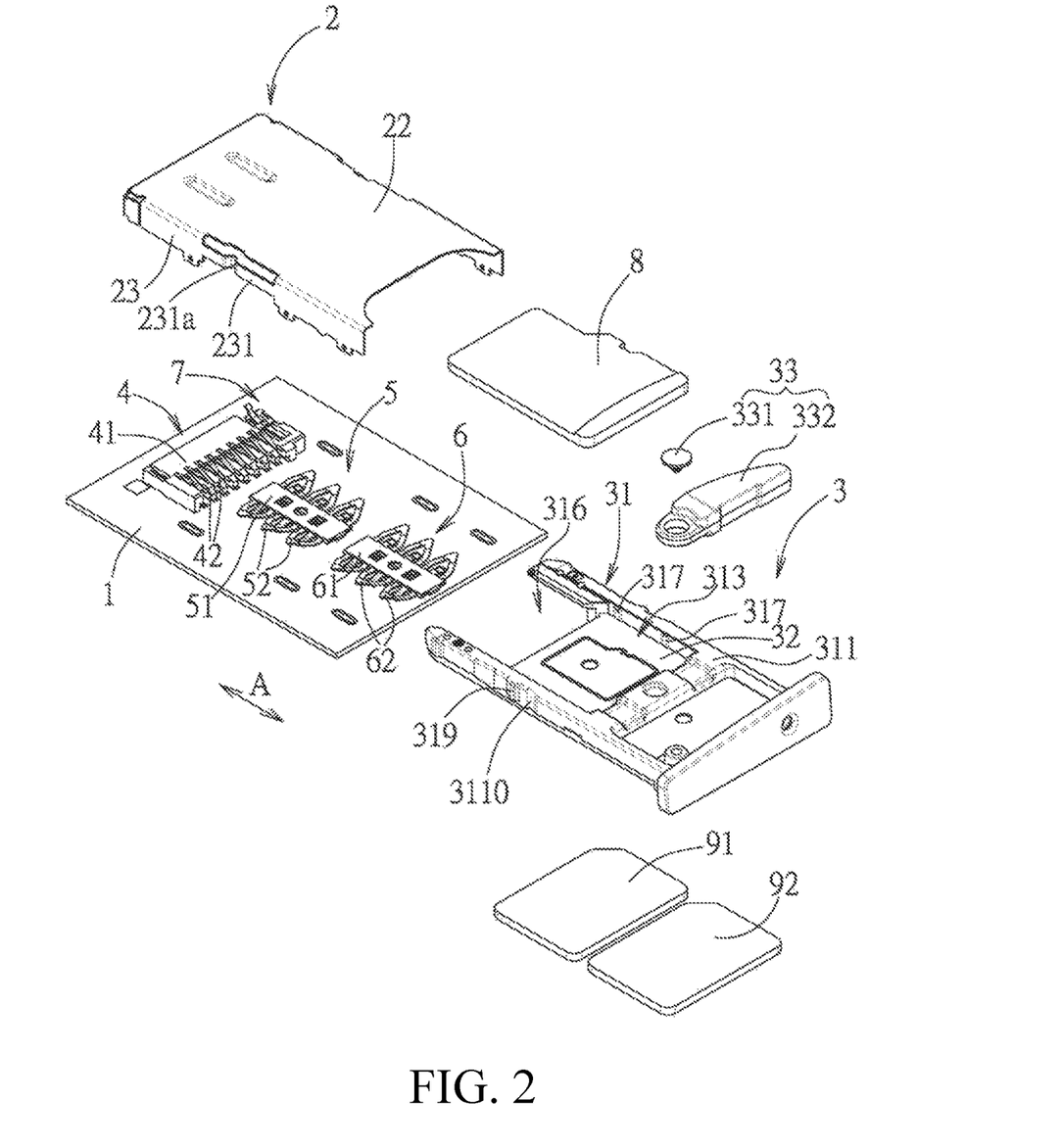
FIG. 2 is an exploded perspective view illustrating an assembling relationship among components of the embodiment.
Figure 3:
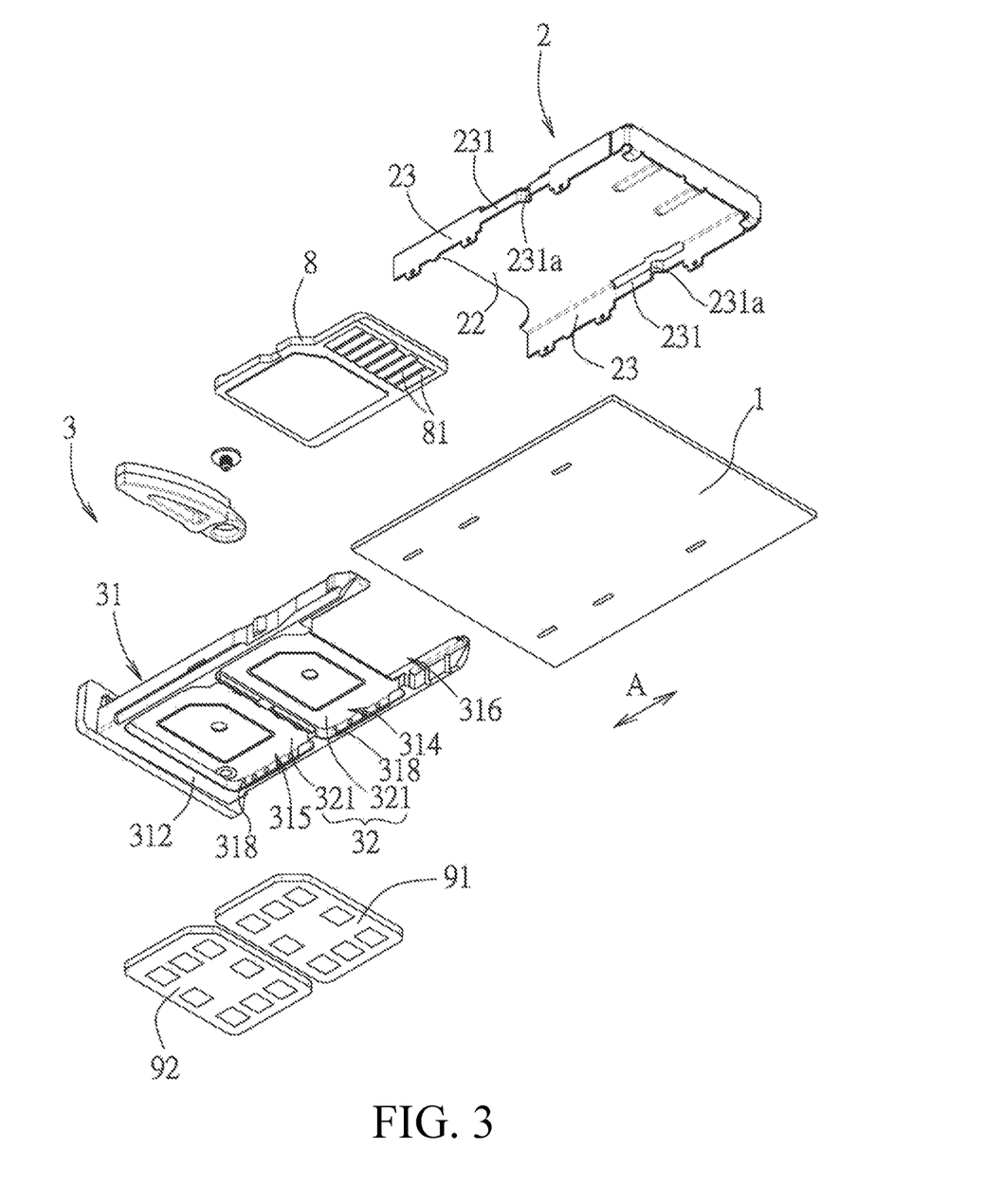
FIG. 3 is a view of FIG. 2 viewed from another angle.
Figure 4:
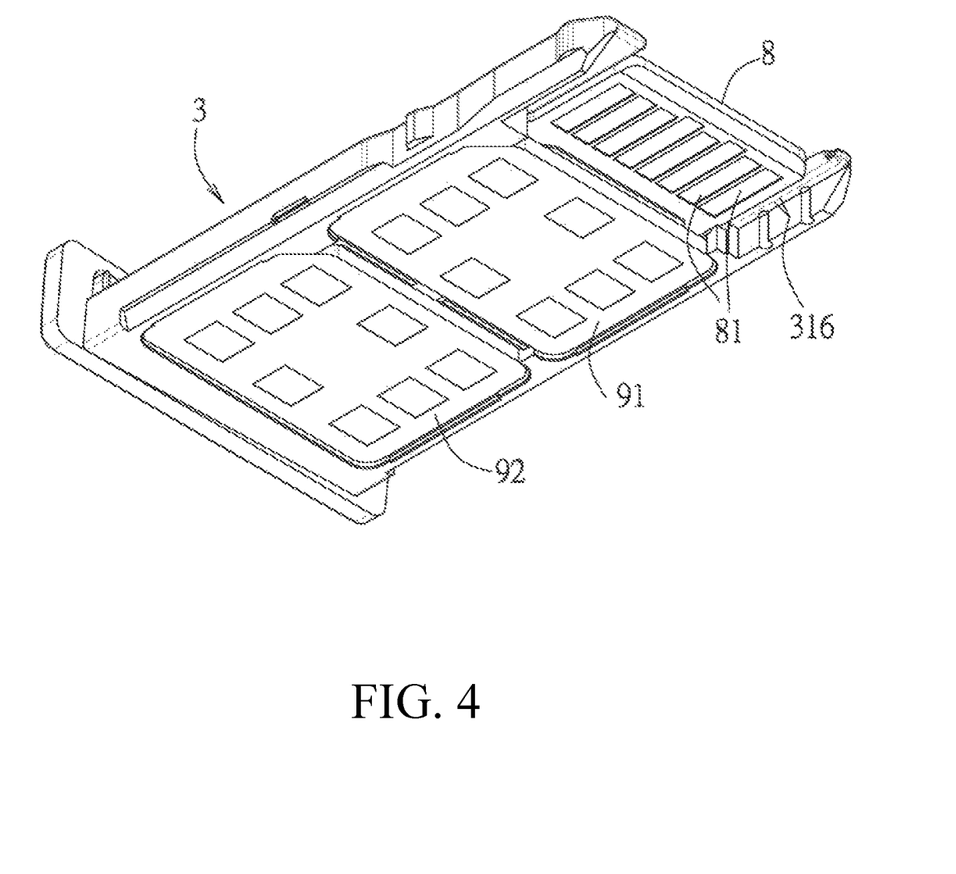
FIG. 4 is a perspective view illustrating an assembling of the tray of the embodiment, a SD card, a first SIM card and a second SIM card.
Figure 13:
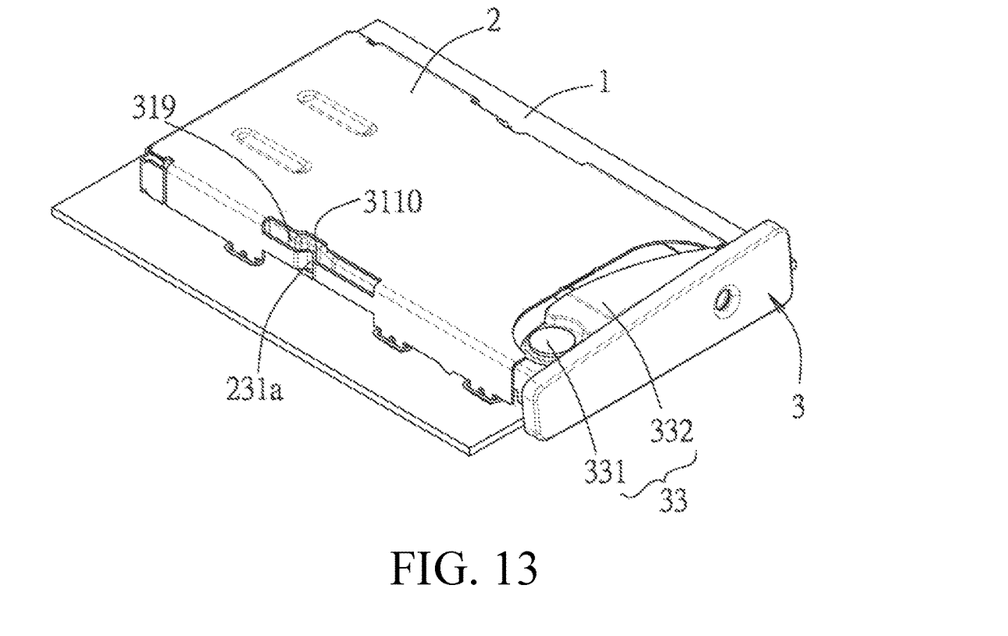
FIG. 13 is a perspective view illustrating that the tray has been inserted into the slot in the embodiment.
Figure 14:
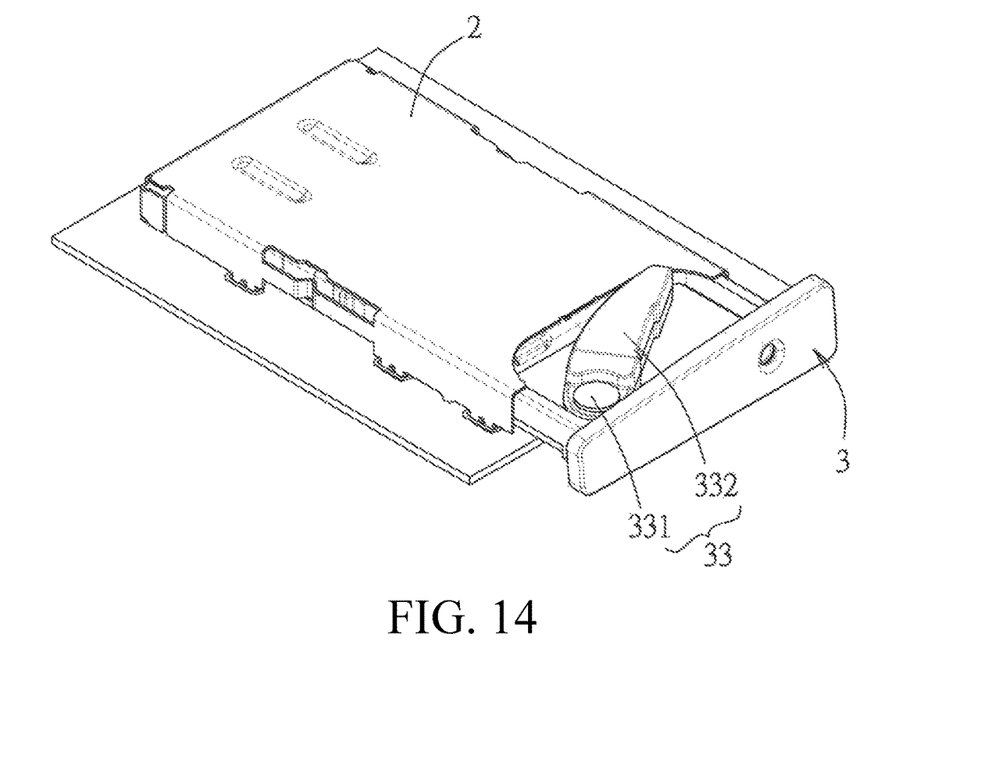
FIG. 14 is a perspective view illustrating that the tray is ejected from the slot via the card ejecting mechanism in the embodiment.

Referring to FIG. 1, FIG. 3 and FIG. 13, the metal shell 2 has a top plate 22 spaced apart from the circuit board 1 and two side plates 23 respectively connected to two sides of the top plate 22 and facing each other. The two side plates 23 each have an elastic section 231 separated from the top plate 22, and each elastic section 231 has a latching portion 231*a* bent and protruding toward the inside of the slot 21. Two sides of the insulative body 31 of the tray 3 further each are formed with a latching block 319 and a latching groove 3110, the latching block 319 and the latching groove 3110 of each side of the insulative body 31 are arranged along the inserting-ejecting direction A and adjacent to each other, when the tray 3 is inserted into the slot 21 and reaches the predetermined position, the two latching portions 231*a* of the metal shell 2 are respectively latched into the two latching grooves 3110 at the two sides of the tray 3 and respectively stop the two latching blocks 319 to move toward the entrance of the slot 21 so as to limit the tray 3. The two side plates 23 of the metal shell 2 further each have two mounting sections 232 respectively connected with two ends of the corresponding elastic section 231, each mounting section 232 has at least a soldering portion 232*a* soldered to the circuit board 1. When the tray 3 is inserted into the slot 21 or ejected from the slot 21, because the latching portion 231*a* may be elastically displaced, the latching block 319 may push outwardly the latching portion 231*a* and move beyond the latching portion 231*a*. Because the latching portion 231*a* is formed by bending the elastic section 231, both of two ends of the latching portion 231*a* are supported, therefore the latching portion 231*a* has a better structure strength, can allow repeated insertion and ejection of the tray 3 and will not be deformed. Furthermore, the two mounting sections 232 respectively connected to the two ends of the elastic section 231 each are fixed to the circuit board 1 via the corresponding soldering portion 232*a*, which can further increase the structure strength of the elastic section 231.

Referring to FIG. 1, FIG. 2, FIG. 13 and FIG. 14, the tray 3 further has a card ejecting mechanism 33 provided on the insulative body 31, the card ejecting mechanism 33 comprises a fixing shaft 331 and an operating bar 332. The operating bar 332 rotates around the fixing shaft 331, and may be operated by an operator so as to reject the tray 3 from the slot 21.

In conclusion, the metallic shielding unit 32 may reduce the interference of the magnetic field generated during high-speed transfer of the SD card 8 on the two SIM cards 91, 92, thereby improving the call quality. Furthermore, the two metal sheets 321 may further reduce the electromagnetic interference generated by the SD card 8, thereby reducing the interference on the antenna signal, and better improving the call quality. And the latching portion 231a bent from the linear elastic section 231 has a higher structure strength, can allow repeated insertion and ejection of the tray 3 and will not be deformed.

The above described contents are only the embodiments of the present disclosure, which cannot limit the scope of the implementation of the present disclosure, namely simple equivalent variations and modifications made according to the claims and the content of the present disclosure are still fallen within the scope of the present disclosure.

What is claimed is:

1. An electronic card connector provided on a circuit board, the electronic card connector comprising:
    a metal shell provided on the circuit board and cooperating with the circuit board to define a slot;
    a tray used to receive a SD card, a first SIM card and a second SIM card, and inserted into and ejected from the slot along an inserting-ejecting direction, the tray comprising an insulative body and a shielding unit, the insulative body having a top surface, a bottom surface opposite to the top surface, a first receiving groove, a second receiving groove, a third receiving groove and an opening region, the first receiving groove being formed on the top surface so as to receive the SD card, the second receiving groove and the third receiving groove being formed on the bottom surface so as to respectively receive the first SIM card and the second SIM card, the opening region penetrating from the top surface to the bottom surface and being communicated with the first receiving groove so as to expose a conductive pad of the SD card out of the bottom surface, the shielding unit being made of metal, provided in the insulative body and positioned between the first receiving groove and the second receiving groove and the third receiving groove;
    a first terminal block provided on the circuit board and positioned in the slot so as to electrically connect the SD card and the circuit board;
    a second terminal block provided on the circuit board and positioned in the slot so as to electrically connect the first SIM card and the circuit board; and
    a third terminal block provided on the circuit board and positioned in the slot so as to electrically connect the second SIM card and the circuit board.

2. The electronic card connector according to claim 1, wherein the opening region, the second receiving groove and the third receiving groove are arranged on the bottom surface along the inserting-ejecting direction, and the second receiving groove is positioned between the opening region and the third receiving groove.

3. The electronic card connector according to claim 2, wherein the shielding unit comprises two metal sheets, the two metal sheets respectively cover the second receiving groove and the third receiving groove.

4. The electronic card connector according to claim 2, wherein the shielding unit comprises one metal sheet, the one metal sheet covers the second receiving groove and the third receiving groove.

5. The electronic card connector according to claim 1, wherein the insulative body further has a plurality of arc protruding portions respectively protruding from two side wall surfaces defining the second receiving groove and two side wall surfaces defining the third receiving groove so as to correspondingly hold the first SIM card and the second SIM card.

6. The electronic card connector according to claim 5, wherein the insulative body further has a plurality of arc protruding portions protruding from two side wall surfaces defining the first receiving groove so as to hold the SD card.

7. The electronic card connector according to claim 1, wherein
    the first terminal block comprises a first insulative housing and a plurality of first terminals provided to the first insulative housing and soldered to the circuit board,
    the second terminal block comprises a second insulative housing and a plurality of second terminals provided to the second insulative housing and soldered to the circuit board,
    the third terminal block comprises a third insulative housing and a plurality of third terminals provided to the third insulative housing and soldered to the circuit board, and
    the first terminal block, the second terminal block and the third terminal block are arranged along the inserting-ejecting direction, and the first terminal block is positioned farthest away from the entrance of the slot.

8. The electronic card connector according to claim 7, wherein
    the electronic card connector further comprises a detection switch provided to the first insulative housing and soldered to the circuit board,
    the detection switch comprises a fixed terminal and an elastic terminal,
    the fixed terminal has two fixed portions spaced apart from each other and fixed to the first insulative housing, a soldering portion extending from one of the two fixed portions and a bridging portion connecting the two fixed portions, the bridging portion has a lower surface facing the circuit board,
    the elastic terminal has a fixed section fixed to the first insulative housing, a soldering section extending from a side of the fixed section, and an elastic arm bent from an end of the fixed section and extending to above the fixed section, the elastic arm has a contact portion which abuts against the lower surface of the bridging portion in a normal state, and a pressed portion formed at a distal end of the elastic arm, the pressed portion is higher than the bridging portion in the normal state, and when the tray is inserted into the slot, the pressed portion is pressed down by the tray and moves toward the fixed section and in turn moves the contact portion so as to separate the contact portion from the bridging portion.

9. The electronic card connector according to claim 1, wherein
    the metal shell has a top plate spaced apart from the circuit board and two side plates respectively connected to two sides of the top plate and facing each other, the two side plates each have a linear elastic section separated from the top plate, and each elastic section has a latching portion bent and protruding into the slot;
    two sides of the insulative body of the tray further each are formed with a latching block and a latching groove, the latching block and the latching groove of each side of the insulative body are arranged along the inserting-ejecting direction and adjacent to each other;
    when the tray is inserted into the slot and reaches a predetermined position, the two latching portions of the metal shell are respectively latched into the two latching grooves at the two sides of the tray and respectively stop the two latching blocks to move toward the entrance of the slot so as to limit the tray.

10. The electronic card connector according to claim 9, wherein the two side plates of the metal shell further each have two mounting sections respectively connected with two ends of the corresponding elastic section, each mounting section has at least a soldering portion soldered to the circuit board.

\* \* \* \* \*